US010116784B2

(12) United States Patent
Homma et al.

(10) Patent No.: US 10,116,784 B2
(45) Date of Patent: *Oct. 30, 2018

(54) CAMERA CAPABLE OF COMMUNICATING WITH OTHER COMMUNICATION DEVICE (71) Applicant: NIKON CORPORATION, Tokyo (JP)

(72) Inventors: Itaru Homma, Setagaya-ku (JP); Chiyuki Kuwata, Zushi (JP); Akira Ohmura, Kawasaki (JP)

(73) Assignee: NIKON CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/475,696

(22) Filed: Mar. 31, 2017

(65) Prior Publication Data
US 2017/0208166 A1 Jul. 20, 2017

Related U.S. Application Data (60) Continuation of application No. 14/603,466, filed on Jan. 23, 2015, now Pat. No. 9,641,786, which is a
(Continued)

(30) Foreign Application Priority Data

Nov. 19, 1998 (JP) .................................... 10-329231
Nov. 19, 1998 (JP) .................................... 10-329232
Nov. 15, 1999 (JP) .................................... 11-323883

(51) Int. Cl.
H04N 7/14 (2006.01)
H04M 1/725 (2006.01)
H04N 7/18 (2006.01)

(52) U.S. Cl.
CPC ........ *H04M 1/72522* (2013.01); *H04N 7/185* (2013.01); *H04M 2250/52* (2013.01)

(58) Field of Classification Search
CPC ....... H04N 7/142; H04N 7/141; G06F 3/0304
See application file for complete search history.

(56) References Cited

U.S. PATENT DOCUMENTS 5,014,267 A * 5/1991 Tompkins ................ H04N 7/15
348/E7.083
5,374,952 A 12/1994 Flohr
(Continued)

FOREIGN PATENT DOCUMENTS

JP H06-205274 A 7/1994
JP S06-205274 A 7/1994
(Continued)

OTHER PUBLICATIONS

Jul. 6, 2010 Office Action issued in Japanese Patent Application No. 10-329232.
(Continued)

Primary Examiner — Maria El-Zoobi
(74) Attorney, Agent, or Firm — Oliff PLC (57) ABSTRACT A cellular phone is capable of telephone-calling with an external device, and includes an antenna by which to communicate with the external device; a lens; an image sensor that outputs an image signal; a display; a loudspeaker; and a processer. The processor controls the display to display an announcement of an incoming call from the external device after receiving a calling signal via the antenna, and in a case that the calling signal is received during operation of the image sensor in a moving image mode, the processor permits communication between the cellular phone and the external device via the antenna and using the loudspeaker and a microphone of the cellular phone after the announcement of the incoming call is displayed by the display and after the processor receives an instruction from an input
(Continued)

device of the cellular phone to allow starting of the telephone-calling with the external device.

26 Claims, 5 Drawing Sheets

Related U.S. Application Data continuation of application No. 13/777,843, filed on Feb. 26, 2013, now Pat. No. 8,970,652, which is a continuation of application No. 12/081,656, filed on Apr. 18, 2008, now Pat. No. 8,416,275, which is a continuation of application No. 10/991,998, filed on Nov. 19, 2004, now abandoned, which is a division of application No. 09/442,387, filed on Nov. 18, 1999, now Pat. No. 6,950,126.

(56) References Cited

U.S. PATENT DOCUMENTS

| | | | |
|---|---|---|---|
| 5,473,366 A | | 12/1995 | Imaeda et al. |
| 5,585,839 A | * | 12/1996 | Ishida .................. H04M 3/567 |
| | | | 348/14.09 |
| 6,034,715 A | * | 3/2000 | Ishida .................... H04N 5/45 |
| | | | 348/14.01 |
| 6,111,604 A | | 8/2000 | Hashimoto et al. |
| 6,211,903 B1 | | 4/2001 | Bullister |
| 6,335,753 B1 | * | 1/2002 | McDonald ............ H04N 7/142 |
| | | | 348/14.01 |
| 6,344,875 B1 | | 2/2002 | Hashimoto et al. |
| 6,354,748 B1 | | 3/2002 | Vrvilo |
| 6,362,851 B1 | | 3/2002 | Lavelle et al. |
| 6,441,842 B1 | | 8/2002 | Fandrianto et al. |
| 6,642,959 B1 | | 11/2003 | Arai |
| 6,775,361 B1 | | 8/2004 | Arai et al. |
| 6,950,126 B1 | | 9/2005 | Homma et al. |
| 7,317,475 B2 | | 1/2008 | Arai et al. |
| 8,416,275 B2 | | 4/2013 | Homma et al. |
| 8,970,652 B2 | | 3/2015 | Homma et al. |
| 2001/0041586 A1 | | 11/2001 | Irube et al. |
| 2004/0218738 A1 | * | 11/2004 | Arai ...................... H04M 1/656 |
| | | | 379/93.17 |

FOREIGN PATENT DOCUMENTS

| | | |
|---|---|---|
| JP | H08-265716 A | 10/1996 |
| JP | S04-08265716 A | 10/1996 |
| JP | H10-224856 A | 8/1998 |
| JP | S10-224856 A | 8/1998 |
| JP | H11-317793 A | 11/1999 |
| JP | S11-317793 A | 11/1999 |
| JP | 2000-092191 A | 3/2000 |
| JP | 2000-092360 A | 3/2000 |
| JP | 2000-151832 A | 5/2000 |

OTHER PUBLICATIONS

Sep. 16, 2008 Office Action issued in Japanese Patent Application No. 10-329232.
Apr. 9, 2008 Office Action issued in Japanese Patent Application No. 10-329232.
Dec. 2, 2008 Office Action issued in Japanese Patent Application No. 11-323883.
Dec. 22, 2009 Office Action issued in Japanese Patent Application No. 2009-016284.
Sep. 23, 2011 Office Action issued in U.S. Appl. No. 12/081,656.
Feb. 10, 2012 Notice of Allowance issued in U.S. Appl. No. 12/081,656.
Sep. 27, 2012 Office Action issued in U.S. Appl. No. 12/081,656.
Nov. 26, 2012 Notice of Allowance issued in U.S. Appl. No. 12/081,656.
Oct. 21, 2014 Notice of Allowance issued in U.S. Appl. No. 13/777,843.
Apr. 27, 2016 Office Action issued in U.S. Appl. No. 14/603,466.
Nov. 15, 2016 Office Action issued in U.S. Appl. No. 14/603,466.
Jan. 5, 2017 Notice of Allowance issued in U.S. Appl. No. 14/603,466.

* cited by examiner

CAMERA CAPABLE OF COMMUNICATING WITH OTHER COMMUNICATION DEVICE

CROSS-REFERENCE TO RELATED APPLICATION

This is a Continuation of application Ser. No. 14/603,466 filed Jan. 23, 2015 (now U.S. Pat. No. 9,641,786), which in turn is a Continuation of application Ser. No. 13/777,843 filed Feb. 26, 2013 (now U.S. Pat. No. 8,970,652), which is a Continuation of application Ser. No. 12/081,656 filed Apr. 18, 2008 (now U.S. Pat. No. 8,416,275), which is a Continuation of application Ser. No. 10/991,998 filed Nov. 19, 2004 (now abandoned), which is a divisional of application Ser. No. 09/442,387 filed Nov. 18, 1999 (now U.S. Pat. No. 6,950,126). The disclosures of the prior applications are hereby incorporated by reference herein in their entirety.

FIELD OF THE INVENTION

The present invention relates to a camera having communication ability, More specifically, the present invention related to a digital still camera, a silver-halide camera and a video camera that are able to communicate with another communication device.

BACKGROUND ART

A digital camera having communication ability that has the function of a digital camera and a cellular phone has previously been proposed.

A cellular phone having a technique for announcing an incoming, call by a sound, or by vibration has been known.

However, as for the digital camera having communication ability (hereafter called "a communication camera"), when a user tries to shoot a picture after communication, the problem of losing a chance for shooting a picture arises because operation to switch to picture shooting from communication is complex. On the other hand, when the user receives an incoming call from another communication device during picture shooting, the problem of difficulty in starting the communication immediately arises because operation of switching to communication from picture shooting is complex.

Furthermore, as for the communication camera announcing the incoming call by vibration, when the user receives the incoming call from another communication device during shooting a picture, the problem of camera-shake caused by the vibration arises, resulting in a blurred picture.

Furthermore, as for the communication camera announcing the incoming call by a sound, when the user receives the incoming call from another communication device during film shooting and audio recording, the problem that the sound of the incoming call is unnecessarily recorded on a medium arises.

Thus, there is a need for a camera having communication ability that switches a mode quickly between a communication mode and a shooting mode. Furthermore, a camera having communication ability should not receive bad influence from vibration and the sound that announces an incoming call.

SUMMARY

It is an object of the present invention to provide a camera, having communication ability, which can switch a mode adequately and easily between a communication mode and a shooting mode.

It is another object of the present invention to provide a camera, having communication ability and ability of announcing an incoming call by vibration, which does not receives bad influence from the vibration.

Furthermore, it is another object of the present invention to provide a camera, having communication ability and ability of announcing an incoming call by sound, which does not receives bad influence of the sound of the incoming call during recording in shooting.

Objects and advantages of the present invention are achieved in accordance with embodiments of the present invention with a camera having communication ability, including a communication device to communicate with another communication apparatus; an imaging device to convert an object to an electronic image; and a switching device to switch a mode between a communication mode, in which communication is performed by said communication device, and a shooting mode, in which shooting is performed by said imaging mode; wherein said switching device switches said communication mode to said shooting mode responsive to completion of communication at said communication mode.

Furthermore, objects and advantages of the present invention are achieved in accordance with embodiments of the present invention with a camera having communication ability, including a communication device to communicate with another communication apparatus; an imaging device to convert an object to an electronic image; and a switching device to switch a mode between a communication mode, in which communication is performed by said communication device, and a shooting mode, in which shooting is performed by said imaging mode; wherein said switching device switches said shooting mode to said communication mode responsive to completion of shooting at said shooting mode.

Furthermore, objects and advantages of the present invention are achieved in accordance with embodiments of the present invention with a camera having communication ability, including a communication device to communicate with another communication apparatus; an imaging device to convert an object to an electronic image; and a control device to control to store a signal transmitted from other communication device during shooting by said imaging device.

Furthermore, objects and advantages of the present invention are achieved in accordance with embodiments of the present invention with a camera having communication ability, including a communication device to communicate with another communication apparatus; an imaging device to convert an object to an electronic image; and a control device to control said communication device to transmit a message to a caller upon receiving a communication from the caller during shooting by said imaging device.

Furthermore, objects and advantages of the present invention are achieved in accordance with embodiments of the present invention with a camera having communication ability, including a communication device to communicate with another communication apparatus; an announcing device to announce an incoming call, which comes from another communication device, to a camera user by a plural of announcing ways; an imaging device to convert an object to an electronic image; a detecting device to detect a state of the camera; a switching device to switch said announcing way of the incoming call responsive to the state of the camera detected by said detecting device.

DETAILED DESCRIPTION

First Embodiment

Reference will now be made in detail to the preferred embodiments of the present invention, examples of which are illustrated in the accompanying drawings.

Figure 1:
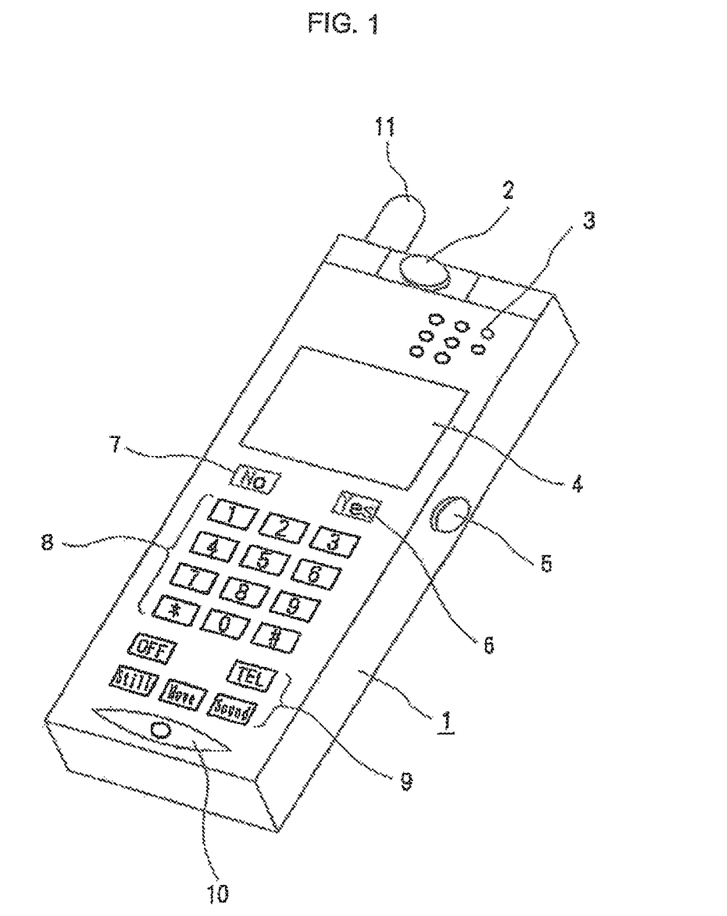
FIG. 1 is an external view of a communication camera illustrating an outside of an embodiment according to the present invention.

A first embodiment of the camera according to this invention will be described with reference to FIG. 1. FIG. 1 is an external view of a communication camera illustrating an outside of an embodiment according to the present invention.

Referring to FIG. 1, a communication camera 1 comprises an optical lens 2, a loudspeaker 3, a monitor 4, a start button 5, an "Yes" button 6, a "No" button 7, a dial button group 8, a mode switching button group 9, a microphone 10, and an antenna 11.

The optical lens 2 forms an object image on an imaging element 201, which will be described later, which is capable of rotating 180 degrees. The loudspeaker 3 converts an electronic signal to sound. The monitor 4 is formed of a device such as a LCD, and displays image information, textual information and other various information.

The start button 5 starts recording various information by setting the mode switch button group 9. The "Yes" button 6 and the "No button" 7 are buttons for operator to instruct the communication camera 1 responsive to an announcement from the communication camera 1. The dial button group 8 is for inputting a telephone number.

The mode switch button group 9 sets power source, communication mode, still video mode, moving video mode and sound record mode. The microphone 10 converts a sound to an electric signal. The antenna 11 transmits and receives radio waves.

Figure 2:
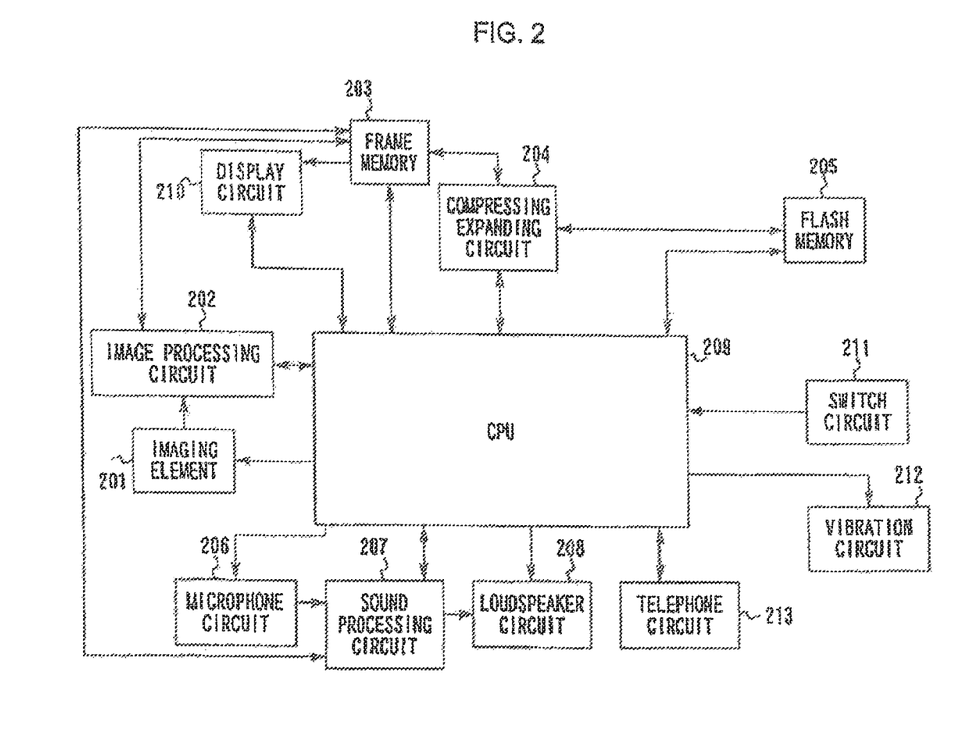
FIG. 2 is a block diagram of the communication camera illustrating a construction of the invention.

FIG. 2 is a block diagram of the communication camera 1 illustrating the construction of the invention.

Referring to FIG. 2 the communication camera 1 comprises an imaging element 201, an imaging processing circuit 202, a frame memory 203, a compressing expanding circuit 204, a flash memory 205, a microphone circuit 206, a sound processing circuit 207, a loudspeaker circuit 208, a CPU 209, a display circuit 210, a switch circuit 211, a vibration circuit 212, and a telephone circuit 213.

The imaging element 201, which is a photoelectric conversion element such as a CCD, outputs an object image signal as image data.

The image processing circuit 202 performs various image processing for the image data output from the imaging element 201.

The frame memory 203 is a volatile semiconductor memory that stores, temporarily, image data processed by image processing, and sound data.

The compressing expanding circuit 204 compresses and expands image data and sound data.

The flash memory 205 is a nonvolatile memory that stores image data and sound data.

The microphone circuit 206 drives the microphone 10.

The sound processing circuit 207 performs various processing for sound data input into microphone 10. The loudspeaker circuit 208 drives the loudspeaker 3.

The CPU 209 is electrically connected to circuits of the communication camera 1 and performs all controls of the communication camera 1. The CPU 209 comprises the timer, and the memory in which various guides, which are announced to the user, are stored in advance.

The display circuit 210 drives the monitor 4. The switch circuit 211 transmits the data of operational states of switches and buttons to the CPU 209.

The vibration circuit 212 announces an incoming call to the user by vibrating the communication camera 1.

The telephone circuits 213 perform telephone functions that are transmitting and receiving information.

The controls performed by the CPU 209 of the communication camera 1 will be explained in details referring to FIG. 3 and FIG. 4 in accordance with an embodiment of the present invention.

Figure 3:
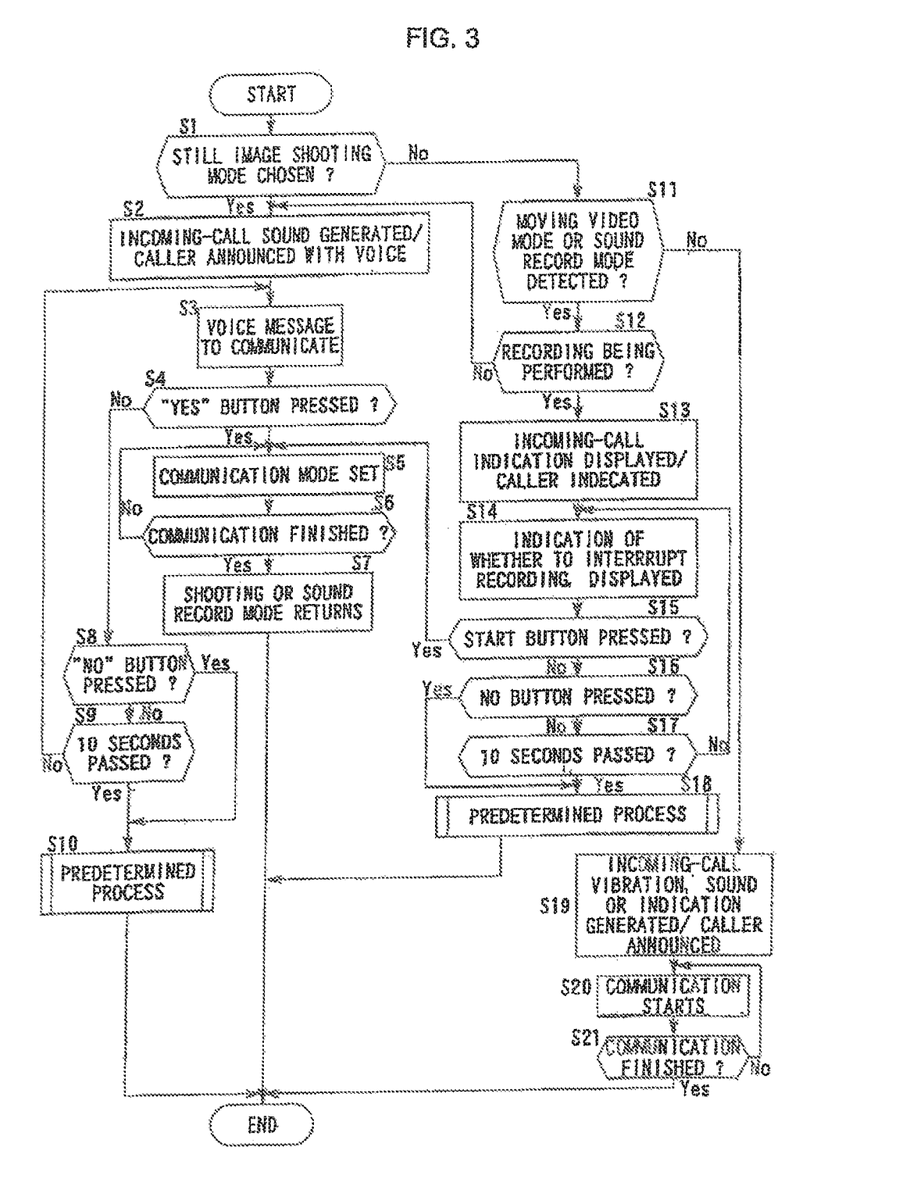
FIG. 3 is a flow chart that shows controls performed by a CPU of the communication camera in accordance with one embodiment of the present invention.

FIG. 3 is a flow chart that shows controls performed by the CPU 209 of communication camera 1 in accordance with one embodiment of the present invention.

The present flowchart starts when the user receives an incoming call sent from a caller.

In step S1, it is determined whether or not the mode chosen by the mode switch group 9 is a still image shooting mode. If it is determined that the mode chosen by the mode switch button group 9 is the still image shooting mode, then the process advances to step S2. If the mode chosen by the mode switch button 9 is not the still image shooting mode, then the process advances to step S11.

In step S2, announcing the incoming call by vibration or displaying is prohibited, and the announcement of the incoming call by a sound is performed, announcing to the caller with voice. Since composition of a picture is important in a still picture, the announcement by displaying the message is prohibited to avoid causing the picture displayed on the monitor 4, to be hidden partly behind the displayed message. However, if it is allowed that the picture is hidden, the announcement by displaying the message is usable.

In step S3, the voice message of whether to interrupt shooting or not, or the voice message of whether to interrupt recording or not, is read out from the memory in the CPU 209 and is output through the loudspeaker 3.

In step S4, it is determined whether or not the "YES" 6 button is pressed. If it is determined that the "YES" button 6 is pressed, then the process advances to step S5, If the "YES" button 6 is not pressed, the process advances to step S8.

In step S5, the current mode is switched from the shooting mode or the sound record mode to the communication mode, resulting in the communication with the caller.

In step S6, it is determined whether or not the communication is completed. If it is determined that the communication is completed, than the process advances to step S7. If the communication is not completed, step S6 is repeated until the completion of the communication is determined.

In step S7, the mode is returned to the shooting mode or the sound record mode.

In step S8, subsequent to step S4 in which it is determined that the "YES" button 6 is not pressed, it is determined whether or not the "No" button 7 is pressed. If it is determined that the "No" button 7 is pressed, then the process advances to step S10. If the "No" button 7 is not pressed, the process advances to step S9.

In step S9, it is determined whether or not the timer of the CPU 209 measures 10 seconds after the incoming call is received. If it is determined that the timer measures 10 seconds after the incoming call is received, then the process advances to step S10. If the timer does not measure 10 seconds, then the process returns to step S3.

Figure 4:
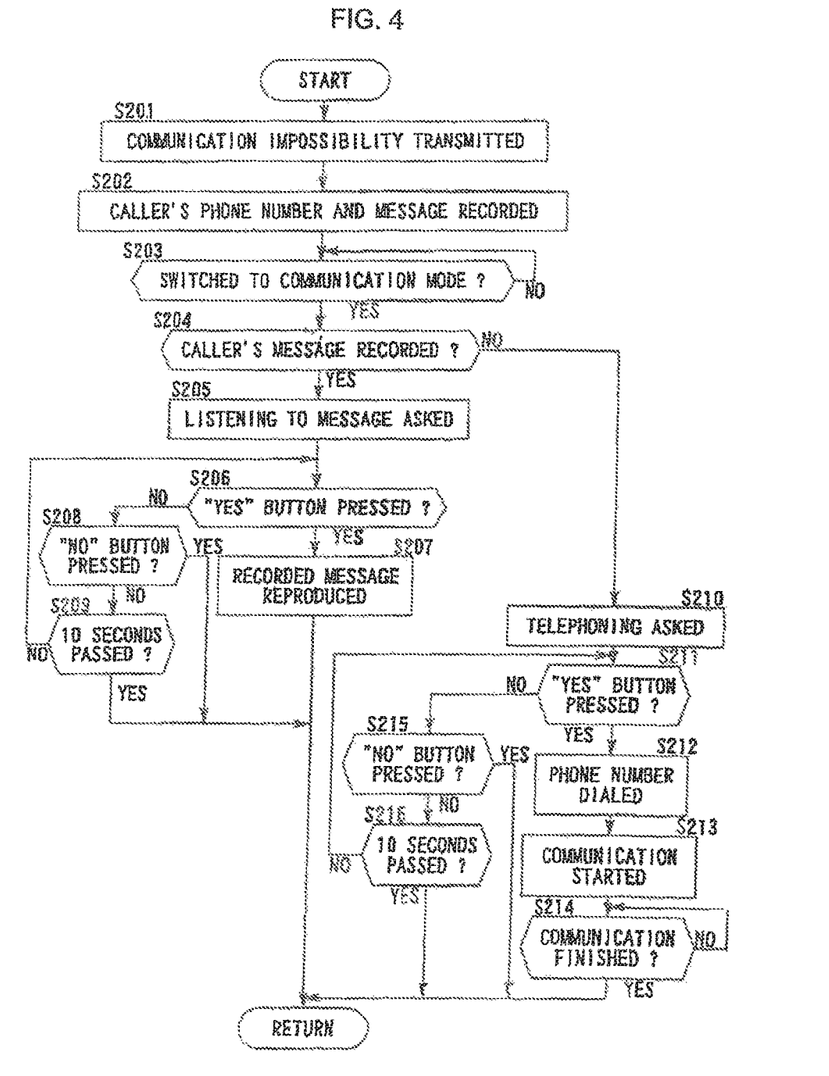
FIG. 4 is a flow chart that shows controls performed in step S10 and step S18 in FIG. 3.

In step S10, the flow shown in FIG. 4 is performed.

In step S11, subsequent to step S1 in which it is determined that the mode is not the shooting mode, it is determined whether or not the mode is one of the moving video mode and sound record mode. If it is determined that the mode is one of the moving video mode and sound record mode, then the process advances to step S12. If the mode is not one of the moving video mode and sound record mode, the process advances to step S19.

In step S12, it is determined whether or not shooting or sound recording is performed in the moving video mode or the sound record mode. If it is determined that shooting or sound recording is performed in the moving video mode or the sound record mode, then the process advances to step S13. If shooting or sound recording is not performed, the process returns to step S2.

In step S13, the announcement by vibration or voice is prohibited, and the incoming call is indicated on the monitor 4, and then the caller's name or information specifying the caller is indicated on the monitor 4.

In step S14 the indication whether to communicate with the caller by interrupting shooting or recording, is read out from the memory of the CPU 209 and displayed on the monitor 4.

In step S15, it is determined whether or not the start button 5 is pressed. If it is determined that the start button 5 is pressed, then the process advances to step S5. If the start button 5 is not pressed, the process advances to step S16.

In step S16, it is determined whether or not the "No" button 7 is pressed. If it is determined that the "No" button 7 is pressed, then the process advances to step, S18. If the "No" button 7 is not pressed, the process advances to step S17.

In step S17, it is determined whether or not the timer of the CPU 209 measures 10 seconds after the incoming call is received. If it is determined that the timer of the CPU 209 measures 10 seconds after the incoming call is generated, then the process advances to step S18. If the timer of the CPU 209 does not measure 10 seconds, the process returns to step S 14.

In step S18, the flow shown in FIG. 4 is performed. In step S19, the announcement of the incoming call is performed by vibration, sound, or indication, and the caller's name or information identifying the caller is announced, because it is determined that the mode chosen by the mode switch button 9 is not the still video mode in step S1, and it is determined that the mode is not one of the moving video mode and the sound record mode in step S11. In step S 20, the communication starts.

In step S21, it is determined whether or not the communication is finished. If it is determined that the communication is finished, then the present flow is completed. If the communication is not completed, the process returns to step S20, and the communication continues.

FIG. 4 is a flow chart that shows controls performed in step S10 and step S18 in FIG. 3.

In step S201, it is transmitted to the caller that the user is not able to communicate with the caller and waiting for the caller's message.

In step S202, when the caller sends the message to the user, the caller's telephone number and the caller's message are recorded. The message can be stored in the memory of the communication camera 1, or in the predetermined memory at the telephone company.

In step S203, it is determined whether or not the mode is switched to the communication mode from the shooting mode. If it is determined that the mode is switched to the communication mode, then the process advances to step S204. If the mode is not switched to the communication mode, determination that the mode is switched to the communication mode from the shooting mode is repeated.

In step S204, it is determined whether or not the caller's message is recorded. If it is determined that the caller's message is recorded, then the process advances to step S205. If the caller's message is not recorded, the process advances to step S210.

In step S205, it is asked whether or not to listen to the message by voice or displayed Indication.

In step S206, it is determined whether or not the "Yes" button 6 not pressed. If it is determined that the "Yes" button 6 is pressed, then the process advances to step S207. If the "Yes" button 6 is not pressed, the process advances to step S208.

In step S207, the recorded message is reproduced and the process is completed.

In step S208, subsequent to step S206 in which it is determined that the "Yes" button 6 is not pressed, it is determined whether or not the "No" button 7 is pressed. If it is determined that the "No" button 7 is pressed, then the present flow is completed. If the "No" button 7 is not pressed the process advances to step S209.

In step S209, it is determined whether or not the timer measures 10 seconds after the message is listened or transmitted to the caller. If, it is determined that the timer measures 10 seconds after the message is listened or announced, then the present flow is completed. If the timer does not measure 10 seconds, the process returns to step S206.

In step S210, it is announced, by the voice or the displayed indication, whether or not to telephone the caller.

In step S211, it is determined whether or not the "Yes" button 6 is pressed. If it is determined that the "Yes" button 6 is pressed, then the process advances to step S212. If the "Yes" button 6 is not pressed, the process advances to step S214.

In step S212, the recorded telephone number is dialed.

In step S213, the communication starts.

In step S214, it is determined whether or not the communication is completed. If it is determined that the communication is completed, then the present flow is completed. If communication is not completed, the process returns to step S213, and the communication continues.

In step S215, subsequent to step S211, in which it is determined that the "Yes" button 6 is not pressed, it is determined whether or not the "NO" button 7 is pressed. If it is determined that the "No" button 7 is pressed then the present flow is completed. If the "No" button 7 is not pressed, the process advances to step S216.

In step S216, it is determined whether or not the timer measures 10 seconds after the user telephones the caller or transmits the message to the caller. If it is determined that the timer measures 10 seconds after the user telephones the caller or transmits the message to the caller, then the present flow is completed. If the timer does not measure 10 seconds, the process returns to step 211.

Thus, in accordance with the present invention, the exposed picture does not become blurred by camera-shake because the announcement of the incoming call by vibration is prohibited during the shooting time of the still picture, the standby time for the still picture and the standby time for the moving picture. Furthermore, in the case of moving picture, the exposed picture does not become blurred due camera-shake, and the communication camera does not record the sound of the incoming call, because the announcement of the incoming call by vibration or sound, is prohibited during shooting.

Furthermore, in accordance with the present the invention, the user can start shooting at once after completion of communication, because the mode is switched to the shooting mode immediately responsive to the completion of the communication while the mode is the communication mode.

Furthermore, in accordance with the present invention, when the incoming call is announced during shooting, by stopping shooting, the user can switches the mode to the communication mode, thereby starting communication immediately.

Furthermore, when the communication camera receives the message during shooting, by sending the caller the message automatically that the user can not correspond to the caller, the user can send the user's state to the caller without interrupting shooting.

Furthermore, when the communication camera receives the message during shooting, by storing caller's telephone number automatically, the user can telephone the caller immediately after the completion of the shooting.

Furthermore, when the communication camera receives the message during shooting, by storing the caller's message, the user can learn the callers message without interrupting the shooting.

Furthermore, the user can shoot as soon as he finishes the communication because the mode is switched to the shooting mode responsive to the completion of communication. Therefore, user does not lose a shooting chance.

Furthermore, by storing a signal from another communication device during shooting, the signal from another communication device can be stored in the memory of the communication camera without interrupting shooting.

As described above, according to the first embodiment of the present invention, by changing the announcing method of the incoming call according to a state of the communication camera, exposed image data does not receive bad influences from the incoming call announcement.

Second Embodiment

Figure 5:
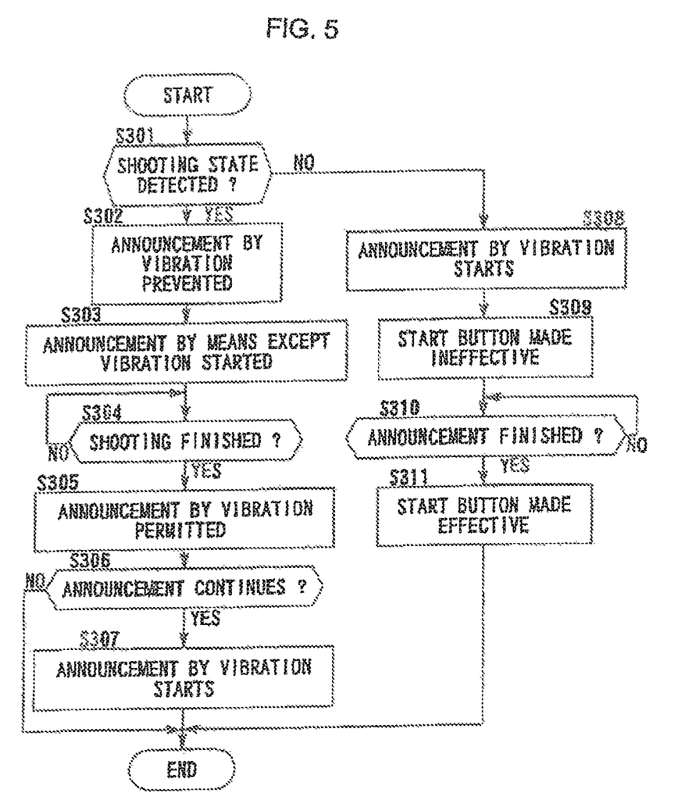
FIG. 5 is a flow chart that shows controls performed by a CPU of the communication camera in accordance with another embodiment of the present invention.

A second embodiment of the camera according to this invention will be described with reference to FIG. 5. FIG. 5 is a flow chart showing the operation of CPU 209 in the second embodiment. The explanation of the camera construction is omitted here because the camera construction in the second embodiment is the same as that in the first embodiment.

The flowchart shown in FIG. 5 starts when the camera 1 receives a signal sent from other communication device in the case where the incoming call announcement by vibration is set in the camera 1.

In step S301, by detecting an operation state of the start button 5 and the imaging element 201, it is determined whether or not the camera 1 is in the shooting state. If the start button 5 is fully depressed to subject the imaging element 201 to light or imaging element 201 is subjected to light responsive to fully depressing of the start button 5, then it is determined that the camera 1 is in the shooting state, and the process advances to step S302. If the start button 5 is not fully depressed and the imaging element 201 is not subjected to light, then it is determined that the camera 1 is not in the shooting state, and the process advances to step S308.

In step S302, the incoming call announcement by vibration is prevented by stopping the vibration circuit 212. The process advances to step S303 after completion of the process in step S302.

In step S303, after it is detected which announcing means is set to the camera 1, either the announcing means except vibration or the default announcing means is performed. For example, if the announcing means set to the camera 1 is sound or vibration, then the incoming call announcement only by sounds is started. If the announcing means set to the camera 1 is only vibration, then the incoming call announcement by the default announcing means except vibration is started. If the default announcing means is sound or voice, the incoming call announcement by sound or voice is started, and if the default announcing means is the display on the monitor 4, the incoming call announcement by the display is started. Then, the process advances to step S304.

In step S304, by detecting an operation state of the start button 5 and the imaging element 201, it is determined whether or not the camera 1 has shot the picture. If the start button 5 is not fully depressed and the imaging element 201 is not subjected to light, then it is determined that the camera 1 has shot the picture, and the process advances to step S305. If the start button 5 is fully depressed or the imaging element 201 is subjected to light, then it is determined that the camera 1 is in the shooting state, and the process waits completion of shooting in step S304.

In step S305, by permitting the vibration circuit 212 to be driven, the incoming call announcement by vibration is allowed. Then, the process advances to step S306 after completion of the process in step S305.

In step S306, it is determined whether or not the incoming call announcement, which has been started in step S303, continues after completion of shooting. If the incoming call announcement continues, then the process advances to step S307. If the incoming call announcement has already completed, then the present flow finishes.

In step S307, the vibration circuit 212 is driven, and the incoming call announcement by vibration is started. Regarding the incoming call announcement by means except vibration, started in step S303, it is acceptable to finish the incoming call announcement by means except vibration when the incoming call announcement by vibration starts, or it is also acceptable to continue the incoming call by means except vibration. When the process in step S307 is completed, the present flow ends. If it is determined that the camera 1 is not in the shooting state in step S301, then the process advances to step S308.

In step S308, the vibration circuit 212 is driven, and the incoming call announcement by vibration is started. Furthermore, it is detected which announcing means is set to the camera 1. If the incoming call announcement by means except vibration is set, the incoming call announcement by means except vibration is also started. After completion of the process in step S308, the process advances to step S309.

In step S309, the operation of the start button 5 is made ineffective. If the start button 5 is turned on, the imaging means does not record. The process advances to step S310 after completion of the process in step S309.

In step S310, it is determined whether or not the incoming call announcement by vibration, which is started in step S308, is finished. If the incoming call announcement is finished, then the process advances to step S311. If the incoming call announcement is not finished, then the process waits in step S310.

In step S311, the start button 5 is made effective, and by turning the start button 5 on, it becomes possible to shoot. The present flow ends when the process in step S311 has finished.

As described above, according to the second embodiment of the present invention, it is determined whether or not the camera 1 is in the shooting state upon receiving an incoming call. If the camera 1 is in the shooting state, then the incoming call announcement by vibration is prevented. Therefore, camera-shake does not occur. If the camera 1 is not in the shooting state, then it is possible to perform the incoming call announcement every time, even in the standby state of shooting.

Furthermore, since operation of the start button 5 is made ineffective while incoming call announcement by vibration continues, it is possible to avoid camera-shake by the vibration.

Furthermore, in the second embodiment, since it is determined whether or not the camera 1 is in the shooting state upon receiving the incoming call, the present invention is applicable to a type of camera that can communicate or shoot without changing the operation mode As for determination of the state of the shooting operation, in the second embodiment, it is determined whether or not the start button 5 is fully depressed so that the imaging element 201 is subjected to light. However, the present invention is not limited to the determination as described in the second embodiment. It is possible to determine the state of the shooting operation by determining whether or not the start button 5 is lightly pressed. In this case, the light press of the start button 5 performs focusing and metering operations, which are preliminary operations of shooting.

Furthermore, in the second embodiment of the present invention, by making the operation of the start button 5 ineffective during the incoming call announcement by vibration, the camera 1 controls the shooting using the imaging element 201 to be prevented. However, the present invention is not limited to the control, during the incoming call announcement by vibration, as described in the second embodiment. While the incoming call announcement by vibration is performed, it is possible to control the shooting such that an imaging signal is not output from the imaging element 201, or is not input into the flash memory 205.

Furthermore, in the second embodiment of the present invention, the camera 1 controls the shooting using the imaging element 201 to be prevented during the incoming call announcement by vibration. However, it is desirable that the shooting using the imaging element 201 is possible when an event or accident that must be recorded at once occurs even during the incoming call announcement by vibration.

Accordingly, in the case where the start button 5 is turned on during the incoming call announcement by vibration, it is possible to allow the camera 1 to shoot after announcing a warning that an exposed image become blur because of camera-shake.

Furthermore, it is possible to allow the camera 1 to shoot only when the combined operation of the start button 5 and other specific operating member is performed, even during the incoming call announcement by vibration. Furthermore, it is also possible to have a mode wherein the start button 5 is set effective even during the incoming call announcement by vibration. Furthermore, it is also possible to have an operation member such that the incoming call announcement is removed when the user wants to stop the shooting during the incoming call announcement by vibration.

Furthermore, in the second embodiment of the present invention, the incoming call announcement is prevented during the shooting operation, assuming that shooting is performed without recording sound. However, in the case of the apparatus able to shoot and record sound at the same time, such as a camcorder, it is possible to prevent not only the incoming call announce by vibration but also the incoming call announce by sound or voice.

As described above, according to the second embodiment of the present invention, by changing the control of the imaging means, it is possible for the user to avoid receiving bad influence to the imaging data.

Although the present embodiment is explained on a digital camera capable of shooting both of a still picture and a moving picture, it is also applicable to a digital camera only for a still picture. And also, it is applicable to a silver-halide camera.

What is claimed is:

1. A cellular phone capable of telephone-calling with an external device, the cellular phone comprising:
    an antenna by which the cellular phone communicates with the external device;
    a lens;
    an image sensor that outputs an image signal from an image formed on the image sensor by the lens;
    a display;
    a loudspeaker; and
    a processer electrically connected to the antenna, the image sensor, the display and the loudspeaker, wherein:
        the processor controls the display to display an announcement of an incoming call from the external device after receiving a calling signal via the antenna, and
        in a case that the calling signal is received during operation of the image sensor, the processor permits communication between the cellular phone and the external device via the antenna and using the loudspeaker and a microphone of the cellular phone after the announcement of the incoming call is displayed by the display and after the processor receives an instruction from an input device of the cellular phone to allow starting of the telephone-calling with the external device.

2. The cellular phone according to claim 1, wherein the processor controls the display to display information related to the external device that initiated the incoming call, after receiving the calling signal from the external device.

3. The cellular phone according to claim 1, wherein the processor controls the loudspeaker to output a message which was transmitted from the external device and stored in a memory outside the cellular phone, upon receipt of a message playback instruction.

4. The cellular phone according to claim 1, wherein the processor controls the loudspeaker to output a message which was transmitted from the external device and stored in a memory which is installed in the cellular phone, upon receipt of a message playback instruction.

5. The cellular phone according to claim 1, wherein the antenna transmits a signal indicating that the cellular phone is not able to conduct the telephone-calling with the external device to the external device after receipt of an instruction to not perform the telephone-calling with the external device.

6. The cellular phone according to claim 5, wherein the processor controls the display to request the instruction whether to conduct the telephone-calling with the external device when the announcement of the incoming call is announced by the display.

7. The cellular phone according to claim 1, wherein
the processor controls storage of a message transmitted from the external device and received via the antenna in a memory installed in the cellular phone.
8. The cellular phone according to claim 1, wherein
the processor controls storage of a message transmitted from the external device in a memory outside the cellular phone.
9. The cellular phone according to claim 1, wherein
the image sensor becomes able to output the image signal after completion of the telephone-calling with the external device via the antenna in the case that the telephone-calling was conducted for the calling signal received during the operation of the image sensor.
10. The cellular phone according to claim 1, wherein
the processor generates a movie from the image signal output by the image sensor.
11. The cellular phone according to claim 10, wherein
the processor interrupts storing of the movie by the image sensor after the calling signal has been received via the antenna.
12. The cellular phone according to claim 1, wherein the display is a liquid crystal display.
13. The cellular phone according to claim 1, wherein
the processor controls a vibration unit of the cellular phone to announce receipt of the incoming call, and
in the case that the calling signal is received during the operation of the image sensor, the processor prohibits the vibration unit from vibrating.
14. A method for controlling a cellular phone to perform telephone-calling with an external device, the method comprising:
announcing an incoming call from the external device on a display of the cellular phone based on receiving a calling signal indicating the incoming call; and
in a case that the calling signal is received during operation of an image sensor of the cellular phone, permitting communication between the cellular phone and the external device via an antenna of the cellular phone and using a loudspeaker and a microphone of the cellular phone after the announcement of the incoming call is displayed by the display and after receiving an instruction from an input device of the cellular phone to allow starting of the telephone-calling with the external device.
15. The method according to claim 14, further comprising:
displaying information related to the external device that initiated the incoming call on the display of the cellular phone after receiving the calling signal.
16. The method according to claim 14, further comprising:
outputting, via the loudspeaker, a message which was transmitted from the external device and stored in a memory outside the cellular phone, upon receipt of a message playback instruction.
17. The method according to claim 14, further comprising:
outputting, via the loudspeaker, a message which was transmitted from the external device and stored in a memory which is installed in the cellular phone, upon receipt of a message playback instruction.
18. The method according to claim 14, further comprising:
transmitting a signal indicating that the cellular phone is not able to conduct the telephone-calling with the external device to the external device after receipt of an instruction to not perform the telephone-calling with the external device.
19. The method according to claim 18, further comprising:
displaying a request whether to conduct the telephone-calling with the external device on the display of the cellular phone when the announcement of the incoming call is announced on the display.
20. The method according to claim 14, further comprising:
controlling storage of a message transmitted from the external device in a memory installed in the cellular phone.
21. The method according to claim 14, further comprising:
controlling the cellular phone to store a message transmitted from the external device in a memory outside the cellular phone.
22. The method according to claim 21, further comprising:
controlling the cellular phone to output, via the loudspeaker, the message stored in the memory outside the cellular phone based on receipt by the cellular phone of a message playback instruction.
23. The method according to claim 14, further comprising:
enabling image capturing by the image sensor after completion of the telephone-calling with the external device in the case that the telephone-calling was conducted for the calling signal received during the operation of the image sensor.
24. The method according to claim 14, wherein
the cellular phone generates a movie from the image signal output by the image sensor.
25. The method according to claim 24, wherein
storing of the movie is interrupted after the announcing of the incoming call.
26. The method according to claim 14, wherein
a vibration unit of the cellular phone announces receipt of the incoming call, and
in the case that the calling signal is received during the operation of the image sensor, the vibration unit is prohibited from vibrating.

* * * * *